(12) United States Patent
Boucadair et al.

(10) Patent No.: US 12,206,704 B2
(45) Date of Patent: Jan. 21, 2025

(54) MITIGATING COMPUTER ATTACKS

(71) Applicant: Orange, Issy-les-Moulineaux (FR)

(72) Inventors: Mohamed Boucadair, Chatillon (FR); Christian Jacquenet, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 430 days.

(21) Appl. No.: 17/439,267

(22) PCT Filed: Mar. 9, 2020

(86) PCT No.: PCT/FR2020/050474
§ 371 (c)(1),
(2) Date: Sep. 14, 2021

(87) PCT Pub. No.: WO2020/183100
PCT Pub. Date: Sep. 17, 2020

(65) Prior Publication Data
US 2022/0210185 A1 Jun. 30, 2022

(30) Foreign Application Priority Data
Mar. 14, 2019 (FR) ...................................... 1902620

(51) Int. Cl.
*H04L 9/40* (2022.01)
*B64U 101/00* (2023.01)

(52) U.S. Cl.
CPC ...... *H04L 63/1466* (2013.01); *H04L 63/1416* (2013.01); *H04L 63/1425* (2013.01); *H04L 63/20* (2013.01); *B64U 2101/00* (2023.01)

(58) Field of Classification Search
CPC . H04L 63/1441; H04L 63/1416; H04L 63/20; H04L 63/1466; H04L 63/1458; H04L 63/1425; B64U 2101/00
See application file for complete search history.

(56) References Cited

U.S. PATENT DOCUMENTS 9,336,239 B1 * 5/2016 Hoffmann ............. G06F 16/583
10,762,571 B2 * 9/2020 Luciani .................. G06Q 40/08
(Continued)

OTHER PUBLICATIONS

Xu Li et al., "Drone-assisted public safety wireless broadband network" 2015 IEEE Wireless Communications and Networking Conference Workshops (WCNCW), IEEE, Mar. 9, 2015, pp. 323-328.
(Continued)

*Primary Examiner* — Mohammad A Siddiqi
(74) *Attorney, Agent, or Firm* — Knobbe, Martens, Olson & Bear, LLP

(57) ABSTRACT

Managing assistance to a communication network capable of routing traffic characteristic of a computer attack is disclosed. A method includes upon detecting a computer attack, identifying at least a first node of the network, requiring a mitigation intervention, and identifying a traffic routing policy in the network; controlling a movement of at least one mobile object comprising at least one communication interface, so as to connect the mobile object to at least a second node of the network determined relative to the first node according to the traffic routing policy; and controlling at least part of the traffic routed by the network, so as to redirect the part of the traffic to the mobile object via at least the second node of the network.

14 Claims, 12 Drawing Sheets

(56) References Cited

U.S. PATENT DOCUMENTS

| | | | |
|---|---|---|---|
| 2011/0085494 A1* | 4/2011 | Ji | H04L 47/32 |
| | | | 370/328 |
| 2011/0138463 A1* | 6/2011 | Kim | H04L 63/1458 |
| | | | 726/22 |
| 2015/0011212 A1* | 1/2015 | Andrei | H04W 36/24 |
| | | | 455/436 |
| 2016/0036837 A1* | 2/2016 | Jain | H04L 63/1416 |
| | | | 726/23 |
| 2016/0173527 A1* | 6/2016 | Kasman | H04L 63/1458 |
| | | | 726/23 |
| 2017/0250954 A1* | 8/2017 | Jain | H04L 63/0254 |
| 2017/0359360 A1 | 12/2017 | Zavdi et al. | |
| 2018/0007518 A1 | 1/2018 | O'Berry et al. | |
| 2019/0113356 A1* | 4/2019 | Fowe | G08G 1/0145 |
| 2019/0121350 A1* | 4/2019 | Cella | G06Q 30/02 |
| 2019/0199756 A1* | 6/2019 | Correnti | H04W 12/08 |
| 2019/0318596 A1* | 10/2019 | Pacella | G05D 1/0027 |
| 2020/0067974 A1* | 2/2020 | Konda | H04L 63/0263 |
| 2020/0285249 A1* | 9/2020 | Woods | G01S 1/74 |
| 2020/0389393 A1* | 12/2020 | Bosch | H04L 63/20 |
| 2022/0225269 A1* | 7/2022 | Lai | H04B 7/0452 |

OTHER PUBLICATIONS

Lindem et al., "OSPF Extensions for Advertising/Signaling Geo Location Information" Oct. 18, 2017.

International Search Report for International Patent Application No. PCT/FR2020/050474, dated Aug. 7, 2020.

* cited by examiner

MITIGATING COMPUTER ATTACKS

CROSS-REFERENCE TO RELATED APPLICATIONS

This application is filed under 35 U.S.C. § 371 as the U.S. National Phase of Application No. PCT/FR2020/050474 entitled "MITIGATING COMPUTER ATTACKS" and filed Mar. 9, 2020, and which claims priority to FR 1902620 filed Mar. 14, 2019, each of which is incorporated by reference in its entirety.

BACKGROUND

Field

The development relates to the field of telecommunications, and relates in particular to the establishment of reliable and robust mechanisms for protecting resources (network, terminals connected to a network, servers connected to a network), in order to respond to computer attacks such as "denial of service" type attacks (or "DDoS", for "Distributed Denial of Service").

Description of the Related Technology

A DDoS attack is an attempt to make resources (e.g. network or computing resources) unavailable to their users. In most cases, such attacks can be deployed on a massive scale, compromising hundreds of thousands of terminals and using these infected hosts to amplify their capacity to cause problems.

When so many machines are involved in executing the attacks, the implementation of appropriate filtering policies, meaning policies capable of isolating the traffic coming from all the infected machines, is all the more complicated because these machines can be massively distributed across several different networks. Moreover, the duration of such attacks (one hour or more) as well as their propagation further complicate the task of the so-called "DPS" services ("DDoS Protection Services") likely to be mobilized for the resolution of these attacks.

More and more DPS offerings are hosted in the "cloud" and not only within the infrastructures operated by access providers. Such deployments raise issues such as early detection of attacks, because the DPS service is not necessarily present on the paths through which data are routed to a network that is the victim of an attack.

Workarounds are conceivable such as the establishment of "tunnels" to force all traffic of a site or of a network to be inspected by the DPS service. However, this implementation based on the establishment of tunnels considerably increases the latency observed by users and imposes sizing constraints on the DPS service in order to be able to handle all the traffic without degrading performance or the quality of experience level as perceived by the customer. In addition, such tunnels are preferred attack vectors.

Even if the DPS service is present on the path of the traffic entering a network (case of access providers offering the DPS service), additional complications are encountered in identifying suspicious traffic. Indeed, with the increase in encrypted traffic, in particular transported over UDP ("User Datagram Protocol"), it is difficult to distinguish legitimate traffic (meaning traffic received with the consent of a user) from suspicious traffic. The difficulty of accessing unencoded control messages similar to those of TCP (for "Transmission Control Protocol"—typically the exchange of SYN/SYN-ACK/ACK type messages) significantly complicates the verification of a machine's consent to receiving traffic.

A client/server architecture specified by the IETF ("Internet Engineering Task Force") aims to provide a mechanism making it possible to signal the detection of suspicious traffic, or even of a confirmed attack, so that appropriate mitigation measures can be implemented as quickly as possible. This architecture is called "DOTS" (for "DDoS Open Threat Signaling"). It is designed to allow a DOTS client to notify a DOTS server that it has detected suspicious traffic potentially characteristic of an ongoing DDoS attack, and that appropriate mitigation actions are required. "Mitigation" action is understood to mean any type of action intended to reduce or even eliminate the impact of the detected or suspected attack (for example dynamically establishing a black hole, etc.).

The example of FIG. 1 shows the case of an attack ATT suffered by a client domain DC. Upon detecting the attack on a target CiB, the domain's DOTS client (CL DOTS) sends a message to the server SER DOTS to request assistance in mitigating the detected attack (MITIG). The server coordinates the actions so that the traffic associated with the denial of service attack is no longer routed to this domain, as illustrated in FIG. 2. Thus, only the "consensual" traffic is routed.

Referring to FIG. 3, the DOTS solution uses two communication channels:
 a signal channel, used only for the duration of the DDoS attacks. A DOTS client can use this channel to request assistance from the DOTS server by informing it that an attack is in progress;
 and a data channel, used if and only if no DDoS attack is in progress. For example, a DOTS client can use the data channel to set up filtering rules, such as filtering the traffic received from certain addresses or the traffic destined for a particular machine.

DOTS is an architecture intended to facilitate the handling of attack mitigation requests sent by a client and received by a server typically operated by the DPS service provider. However, depending on various contexts (nature of the attack, location of the source where the attack originates, attack amplitude, perimeter, and scope, in particular), the DOTS mechanism may prove to be insufficient or even ineffective.

SUMMARY OF CERTAIN INVENTIVE ASPECTS

The Development Improves the Situation

For this purpose, it proposes a method for managing assistance to a communication network capable of routing traffic characteristic of a computer attack, the method comprising:
 upon detecting a computer attack, identifying at least a first node of the network, requiring mitigation intervention, and identifying a traffic routing policy in the network,
 controlling a movement of at least one mobile object comprising at least one communication interface, so as to connect the mobile object to at least a second node of the network determined relative to the first node according to said traffic routing policy,
 controlling at least part of the traffic routed by the network, in order to redirect said part of the traffic to the mobile object via at least said second node of said network.

Within the meaning of the development, a node requiring mitigation intervention is a node typically identified in a mitigation plan as being the target, the source, or the collateral victim of an attack, or even a node involved in the establishment of this mitigation plan (for example, by executing a traffic redirection policy, by modifying its routing table). The term "mitigation plan" is understood to mean the set of actions and measures implemented to mitigate an attack.

Thus, the development proposes a processing of attacks that is based on a principle of mobility. This ability to be mobile makes the development's implementation particularly effective in the time required to process mitigation requests and in the execution of mitigation actions.

In one embodiment, said second node corresponds to the first node. This is a mode detailed below with particular reference to FIG. 12 and called "local loop".

Alternatively, the second node is separate from the first node, which can correspond to a "parallel" or "bypass" mode detailed below with reference to FIG. 14.

In one embodiment, a plurality of mobile objects is provided, each comprising at least one communication interface for communication at least between mobile objects, and a first mobile object among said plurality of mobile objects is controlled so as to connect to at least said second node of the network.

These mobile objects may for example be drones constituting a fleet of drones as presented in the exemplary embodiments below.

The identification of the first node of the network and of the traffic routing policy in the network can be carried out by a mitigation server linked with at least one of the mobile objects (including the case where the mitigation server is embedded in one of the moving objects).

The computer attack may be detected by a second mobile object, connected to the network, which may or may not be the same mobile object as said first mobile object connected to the second node of the network.

Alternatively, the computer attack may be detected by a third node of the network.

The detection may be carried out by a node which does not require intervention and/or which is also not involved in the mitigation plan.

As a variant, this third node may correspond to said first node.

In general, said traffic characteristic of the computer attack may or may not be sent from at least one node of the network. This traffic characteristic of the computer attack may also be intended for at least one node of the network. In addition, it may be local, in at least one node of the network (in the case of viruses, typically).

In one embodiment, the mobile object may be equipped with a processing circuit comprising computing resources providing computing capabilities for processing at least said part of the traffic redirected to the mobile object.

The required intervention may be traffic mitigation in response to a denial of service attack (DDoS) for example.

In one embodiment, the mobile object is configured to analyze and filter at least said part of the traffic redirected to the mobile object (concept of traffic "scrubbing").

The mobile object may be configured to establish communication by radiofrequency link in order to connect to at least said second node, the movement of the mobile object being remotely controllable so as to approach a geographical position of the second node.

Such an embodiment in particular makes it possible to facilitate the emergence of protective networks capable of detecting and anticipating attacks even before they reach their targets.

Such an implementation advantageously allows:
on-demand activation of a filtering function for suspicious traffic in order to "scrub" the network of all traces of this traffic as close as possible to the source (target) of the attack;
reducing the load on the equipment involved in propagating the attack traffic, so that legitimate traffic can continue to be routed under the best conditions despite the presence of attack traffic and regardless of its volume;
implementing the protective measures in a dynamic and automated manner for any location of the resources mobilized in mitigating the attack, while preserving continuity and quality of the services subscribed to by the users;
offering a "portable" and mobile DPS service for more effective mitigation;
exploiting the resources of a portable mobile DPS service, capable of detecting and intervening at any time and at any location (in the network) where an attack has been detected;
ensuring continuity of the services offered by the protected network.

In an exemplary embodiment, the method may comprise:
sending a graft message to the mobile object, in order to command a movement of the mobile object and establish a connection of the mobile object to the second node, designated in the graft message,
sending a routing policy message to the mobile object, in order to command at least one traffic routing rule for routing by the mobile object,
sending a (second) routing policy message, this time to at least the second node, in order to command at least one traffic routing rule for routing by the second node.

The method may further comprise:
upon receiving an end-of-assistance request for the processing of the computer attack, controlling the object so as to analyze at least said part of the traffic, and, depending on the analysis:
confirming an end of assistance, or
deciding on a time delay before the end of assistance.

If the end of assistance is confirmed, it is possible to provide for sending a stop-intervention message to the mobile object.

Routing rules may also be provided, comprising an instruction for the gradual resumption of normal traffic by the first node requiring the intervention, before the end of assistance.

The sending of these various messages may be done by at least one mitigation server linked with the mobile object.

The development also relates to a computer program comprising instructions for implementing the above method, when said instructions are executed by a processor of a processing circuit.

This processing circuit can typically be installed in a mitigation server of the type presented above. The processing circuit can typically include a communication interface for communicating for example with at least one node of the network and at least one mobile object, as well as a memory storing instructions of the computer program, and a processor for executing them. This computer program can implement a general algorithm such as the one illustrated as an example in FIG. 25.

The development also relates to a system for managing assistance to a communication network capable of routing traffic characteristic of a computer attack, comprising at least:
- a mobile object comprising at least one communication interface for connecting to at least one node of the network,
- a mitigation server configured for, in response to detection of a computer attack:
  - identifying at least a first node of the network, requiring mitigation intervention,
  - identifying a traffic routing policy in the network,
  - controlling a movement of the mobile object so as to connect the mobile object to at least a second node of the network, determined relative to the first node according to said traffic routing policy,
  - controlling at least part of the traffic routed by the network, so as to redirect said part of the traffic to the mobile object via at least said second node of said network.

The development also concerns a mitigation server for assisting a communication network capable of routing traffic characteristic of a computer attack. In particular, the mitigation server is configured for, in response to detection of a computer attack:
- identifying at least a first node of the network, requiring mitigation intervention,
- identifying a traffic routing policy in the network,
- controlling a movement of at least one mobile object comprising at least one communication interface, so as to connect said mobile object to at least a second node of the network, determined relative to the first node according to said traffic routing policy,
- controlling at least part of the traffic routed by the network, so as to redirect said part of the traffic to the mobile object via at least said second node of said network.

The implementation of the development then makes it possible to block (or at least contain) attacks which can be multifaceted (typically denial of service, propagation of computer viruses, identity theft for the purpose of data theft, ransomware, etc.), on targets or relays serving to propagate attack traffic which can be extremely varied (fixed and mobile terminals, connected objects, Web servers, network resources, IP prefixes, etc.). As such, implementing the development makes it possible, via the various embodiments proposed, to solve the following technical problems which are usually of a nature to cripple the efficiency of a conventional DOTS architecture.

The security policies put in place by operators are essentially based on traffic filters activated at various fixed and static locations of the network (routers, firewalls, switches for access to cloud infrastructures, devices for traffic collection and access, etc.) and the complexity of adjusting them dynamically according to an attack in progress is proportional to the amplitude of the attack and to the intervention capabilities of the operator. In contrast, the development offers protection that is "modular" and "adjustable" according to the attack.

Access to the resources involved in implementing security policies can be compromised when an attack is in progress and in particular when the attack affects some or all of these resources. It is particularly difficult or even impossible to access these resources, modify a configuration, or install patches while an attack is in progress. The development offers a solution to this problem by enabling an expanded capacity of network resources and the redirection of traffic.

Furthermore, in the state of the art, the attack traffic is propagated in the network at the expense of the level of quality associated with the services subscribed to by the users; efficiency in routing the legitimate traffic is thus degraded by the propagation of attack traffic. This approach can impact the quality of experience associated with this network. Conversely, the development preserves the quality of experience offered by the network, by proposing a redirection of traffic and by enabling mitigation intervention as close as possible to the target of the attack and/or to the source thanks to the mobility of the objects involved in the mitigation.

In addition, in conventional techniques, the processing of requests to implement mitigation actions may be remote from the place where the attack was detected, with the risk of adversely impacting the time when the mitigation actions will start to be effective. The DPS service must ideally be able to be called upon and to act as closely as possible to the location where the attack was detected, which is allowed by the development due to the mobility of the objects which can thus intervene as closely as possible to the target and/or to the source of the attack.

Finally, the development does not require the use of tunnels to join a DPS service, which, as mentioned above, is not optimal, since tunnels are preferred attack vectors.

BRIEF DESCRIPTION OF THE DRAWINGS

Other features, details, and advantages of the development will become apparent from reading the detailed description below, and from analyzing the appended drawings, in which.

DETAILED DESCRIPTION OF CERTAIN ILLUSTRATIVE EMBODIMENTS

Figure 1:
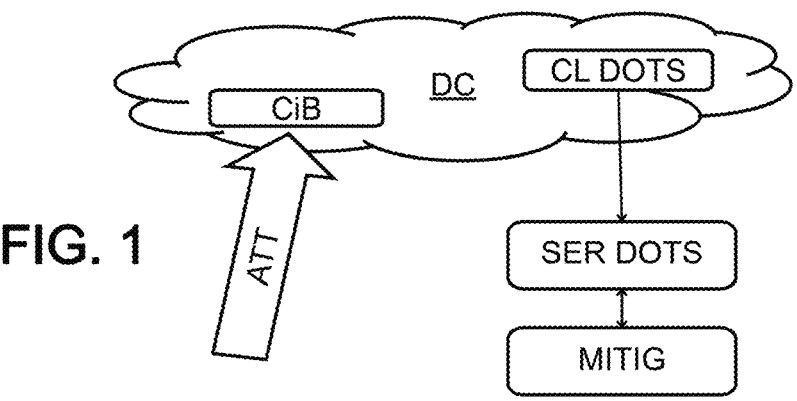
FIG. 1 illustrates an example of an attack (before a DOTS request)
Figure 2:
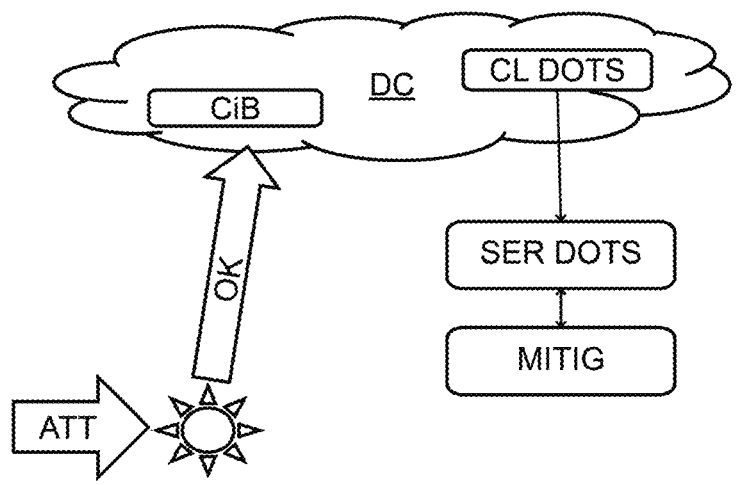
FIG. 2 illustrates an example of an attack (after the DOTS request)
Figure 3:
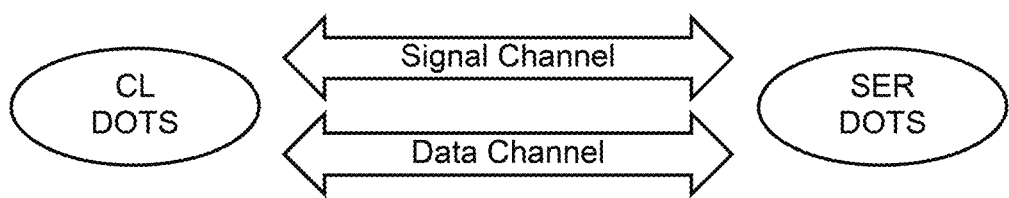
FIG. 3 schematically illustrates DOTS channels (for signaling and data)

The method described below applies to any type of mobile object (drone, autonomous car, stratospheric balloon, airplane which carries one or more routers, etc.), even though drones are used hereinafter and represented in the figures for illustrative purposes. Thus, "drone" is understood hereinafter to mean an unmanned aerial vehicle (UAV), or an unmanned ground vehicle (UGV), etc., in a general manner and with no specific assumption regarding the movement and autonomy capabilities of this drone.

The following examples of attacks relate to denial of service attacks, but the described solution applies to other types of attacks, such as the propagation of computer viruses, the exploitation of vulnerabilities in operating systems, etc.

The proposed solution is recursive: a fleet of mobile objects can be used for mitigation purposes for a network composed of other mobile objects (for example, a network composed of airplanes, a vehicular network (Vanet, "Vehicular Ad-hoc Network"), a MANET network (Mobile Ad-hoc Networks)).

The solution does not describe how a mobile fleet can be restructured (by excluding a drone from the topology for example, or by activating new connections, transformation/evolution of the topology, etc.) to protect itself from an attack undergone by the fleet itself.

Furthermore, the functional structuring of a DPS service as well as its interaction with the resource(s) to be protected are known to those skilled in the art, and the following description does not detail these particular aspects.

The communication sessions between the various elements described below are established for example using the DTLS protocol (Datagram Transport Layer Security), in particular but not exclusively its version 1.3, or the TLS protocol (Transport Layer Security), for example its version 1.2 or 1.3. The details of (D)TLS exchanges and those concerning the management of security keys are not reproduced in the following.

In addition, it is assumed here that the various elements considered in the context of the development and intended to interact (e.g. mobile objects, mitigation server, elements (also called nodes) of the network, agents, etc.) must mutually authenticate. Thus, messages received from a source impersonating a legitimate element can be rejected by another element. In the same manner, requests from nodes of the network that are not authorized to access the mobile DPS service described below are ignored. It is assumed in the following that this mutual authentication procedure is implemented by the various elements considered (mobile object, mitigation server, network nodes, agent, etc.).

In general, one or more fleets of mobile objects are deployed for the monitoring and mitigation of attacks undergone by networks or terminals/servers connected to these networks. Thus, separate fleets of mobile objects can be considered for network monitoring on the one hand and for mitigation operations on the other hand. As a variant, the same fleet (or fleets) of mobile objects can perform the monitoring and mitigation functions.

Furthermore, the following is considered in general.

The mitigation actions may involve border elements of a network (for example "ASBR" routers, for "Autonomous System Border Router") or transit elements within this network. Furthermore, the implementation of the development can enabling handling the case where sources at the origin of an attack may be hosted within the actual network infrastructure to be protected (typical case of "Man-in-the-Middle" attacks (MITM) for example). The mitigation actions can concern the traffic (incoming, outgoing, or both—for example with the dynamic creation of a black hole intended to eliminate attack traffic), and involve one or more nodes.

No particular assumption is made concerning the topology of the underlying network or the type of traffic that it carries. Indeed, a network can be an operator's network, but also a network such as the one used by IP connectivity providers or content providers (CDN, for "Content Delivery Network"), or even a network of autonomous cars, a network of sensors, a connectivity network composed of airplanes, etc.

Figure 4:
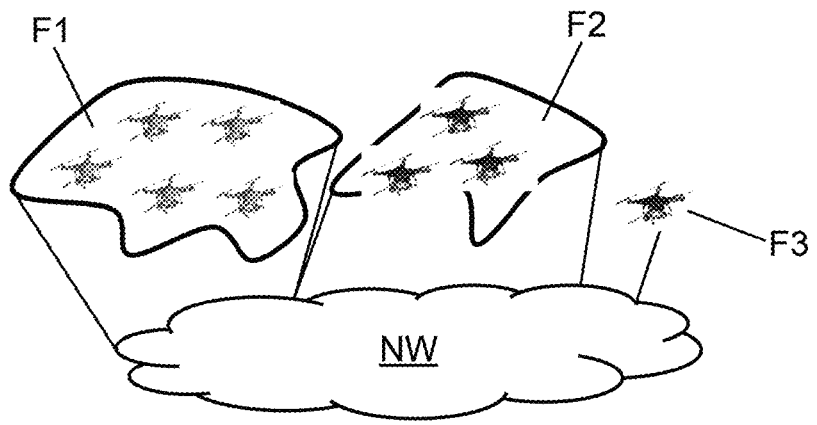
FIG. 4 illustrates an example of a network protected by several fleets of mobile objects (drones here)

According to the development and as mentioned above, the same network can be protected by one or more fleets of mobile objects. With reference to the example of FIG. 4, three fleets of drones protect a same network NW. These three fleets F1, F2, F3 have distinct scopes (and thus different perimeters of intervention). The fleets which protect the same network can also have the same perimeter of intervention.

Figure 5:
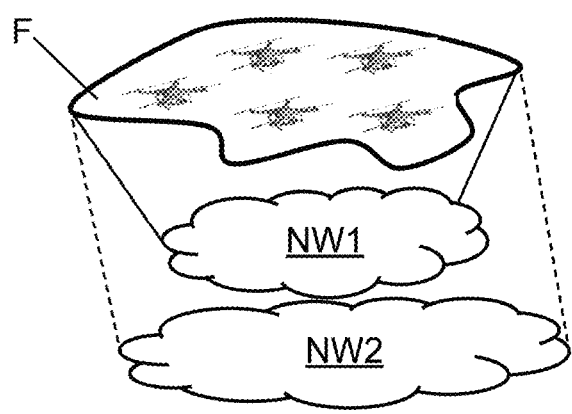
FIG. 5 illustrates an example of one fleet protecting here several networks.

Furthermore, the same fleet can protect one or more underlying networks. With reference to the example of FIG. 5, the same fleet of drones F can protect two networks (NW1 and NW2). Some or all of the drones forming the fleet F can simultaneously participate in mitigation operations on segments of these two networks. In this case, network identifiers, called "network_id", are used to identify a network in an unambiguous manner.

The "network_id" identifier can be:

a PLMN ("Public Land Mobile Network") network identifier, an autonomous system (or "AS") number, etc.

Each fleet is composed of one or more mobile objects. Each object is identified by a unique identifier called "object_id". This identifier may be an alias, a domain name, an IP address, a URI (Uniform Resource Identifier), an E.164 number such as for example MSISDN (Mobile Station ISDN Number), or some other identifier. With reference to the example of FIG. 4, the first fleet F1, second fleet F2, and third fleet F3 are respectively composed of 5, 3, and 1 objects.

The size of a fleet, the design capacity (meaning the capacity for traffic that can be handled/transported/processed by a fleet), the services offered, the geographical scope, etc. are specific to each fleet.

The same fleet can be composed of mobile objects of different types. For example, a fleet can be composed of UAV or UGV vehicles (defined above) and/or even autonomous cars. These various objects coordinate for the execution of the required mitigation tasks.

A fleet may have at least one embedded "mitigation server" service function or may interface with one or more external mitigation servers. These mitigation servers may be fixed servers or may be part of another mobile fleet.

The "mitigation server" function may be provided by the same software instance, or may be composed of several elementary service functions by means of service function chaining (SFC). These service functions may be embedded in separate physical nodes.

Several fleets may have an identical configuration (size, design capacity, services, etc.). However, a fleet can be changed dynamically to include new items or support new services. For example, execution of a new mitigation function may require introducing an additional drone, increasing the fleet's processing and routing capacity, connecting to other networks, etc. These decisions may, for example, be the responsibility of an (external) controller responsible for managing the fleet, or even one or more "controller" functions embedded in some of the drones in the fleet.

A fleet of mobile objects may be connected to one or more other networks that are different from the one it protects, for example to optimize traffic flow (for example 5G network, 4G, WLAN, etc.).

Communication between two mobile objects of a same fleet can be direct (meaning via associations with no intermediate network) or indirect (for example via a wide area network such as a 4G or 5G network). The communication mode is selected according to the communication context (for example direct communication is used for the flow of attack traffic, while indirect communication can be used to instruct a mobile object to position itself within an area of intervention). Both modes of communication can be maintained simultaneously.

In general, several fleets can be interconnected for coordination and efficiency in the execution of monitoring and/or mitigation actions.

Figure 25:
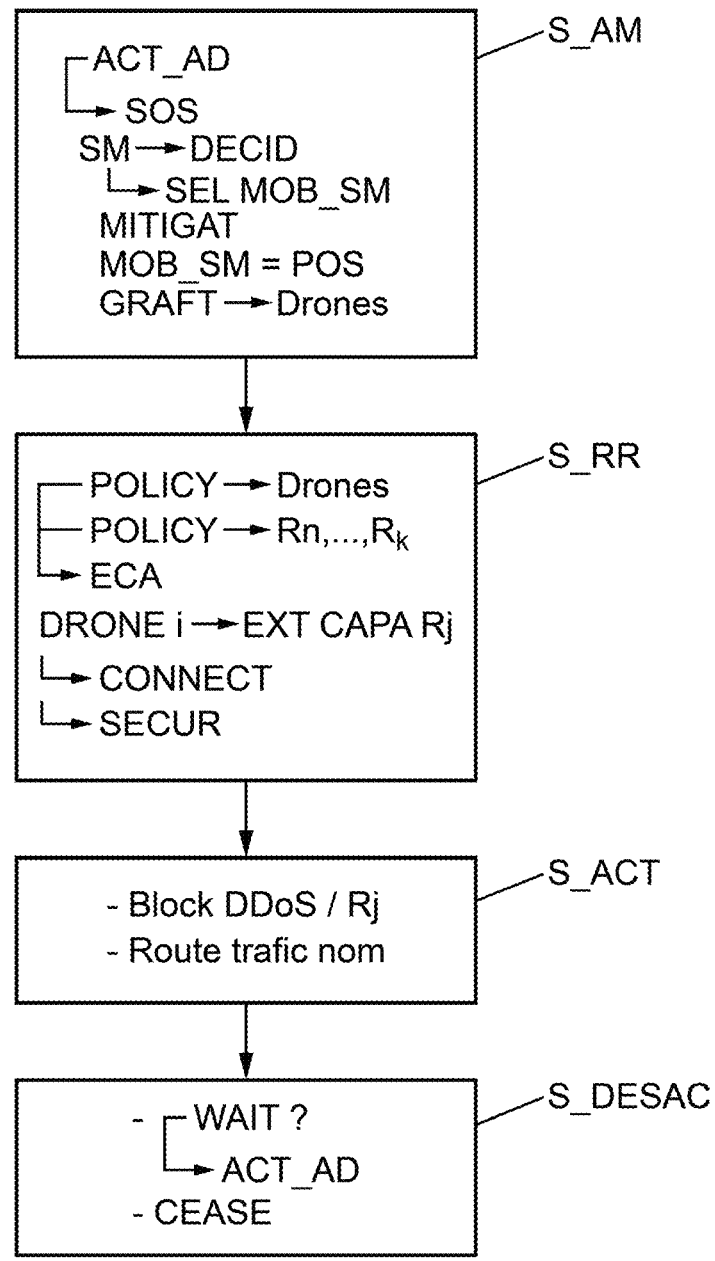

Referring now to FIG. 25, a general method within the meaning of the development can begin, for example, with a step of detecting and triggering mitigation operations S-AM (for "ACTIVATION_MITIGATION").

This involves an activation (or triggering) of mitigation operations via at least one fleet. Here, a mitigation server decides the actions to be taken so that a fleet of what are called "mitigation" mobile objects connects to the network where an attack has been detected (as presented below with reference to step S-RR for "ATTACHMENT_NETWORK"), but also mitigation actions to be performed (step S-AM). The mitigation actions comprise in particular the identification of a traffic routing policy in the network which in particular allows identifying the node or nodes of the network to which the fleet must connect.

The connection and mitigation phases are not necessarily the object of any particular chronology: mitigation actions can be defined and prepared (for example, construction of new traffic filters, updating the database maintained by the mitigation server and descriptive of the attacks currently being processed in particular, etc.) without the intervention fleet being connected beforehand to the network where an attack has been detected.

It is assumed here that dedicated security agents ACT-AD are activated within the network. One or more security agents may in fact be active in the network. The selection of the network nodes carrying these active agents is a decision local to the network operator. Typically, these agents ACT-AD are tasked with analyzing the traffic, the interface counters, as well as other relevant events of a type to raises suspicions about the traffic (frequent route change announcements, large number of ICMP (for "Internet Control Message Protocol") error messages, or others) and then to determine whether assistance from a mitigation server is necessary, in the event an attack is detected (whether or not it is confirmed).

It should be noted that an agent can be embedded in a node of the network affected by an attack in progress. Similarly, the agent can detect an attack which concerns another node of the network. The node that detected the attack may or may not be involved in executing the mitigation plan.

Recall that within the meaning of the development, a node requiring mitigation intervention is a node typically identified in a mitigation plan as being the target, the source, or the collateral victim of an attack, or a node involved in implementing this mitigation plan (for example by executing a traffic redirection policy, by modifying its routing table).

The network thus requests assistance SOS, for example via one of these dedicated security agents ACT-AD embedded within it.

Figure 7:
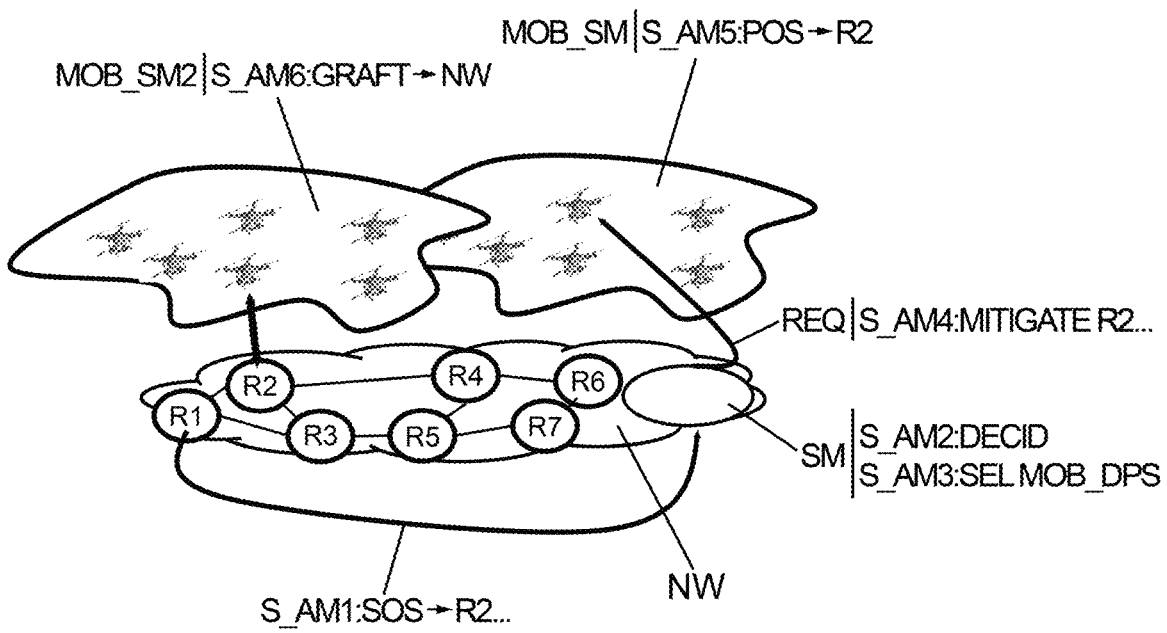
FIG. 7 illustrates an example activation of mitigation actions triggered after a request is sent by an agent located in the network.

An example of the steps of the assistance request and its processing is detailed in FIG. 7. A network agent R1 sends a message called for example SOS (in step S-AM1) to indicate at least one suspected target (for example a node R2, an IP prefix, a network resource, or others) to at least one mitigation server SM, which here is part of the network NW. The network decides, after analyzing the request, to call upon at least one mobile mitigation fleet (hereinafter referred to as "mobile fleet" for simplification), for example a mobile fleet composed of drones. Several SOS messages can be received by the server SM.

The SOS (target, type, . . . ) message may in particular comprise the following fields:

a "target" field indicating the target concerned by the request. A target may be an IP prefix, an IP address, a node, a list of nodes, a network segment, a network interface, etc. A node is identified by a unique identifier such as an IP address, an alias, a domain name, a geographical location, etc. A network segment is identified by a (private) autonomous system number AS, an area identifier according to the OSPF ("Open Shortest Path First") routing protocol, a geographical location, an alias, etc. In the case where no target is indicated in the SOS message, this conventionally can indicate that the source of the SOS message is the actual target of the attack;

an optional "type" field which indicates the type of attack in progress. The mitigation server can ignore this information.

Other information may be included in the SOS message, such as the identifier of a network (network_id) or the like.

Upon receiving this SOS message, the mitigation server SM of the network NW:

decides according to the SOS message whether or not to implement a mitigation plan which will use the resources of the mobile fleet (step S-AM2), and, where appropriate, selects a mitigation server of the mobile fleet or linked with (i.e. connected to) the mobile fleet (denoted MOB-SM in FIG. 7), in step S-AM3.

Information to characterize the anomaly as well as the network nodes concerned is then communicated by the mitigation server SM of the network NW to this mitigation server MOB-SM linked with the mobile fleet, in a mitigation request message denoted MITIGATE here, in step S-AM4.

This MITIGATE (network_id, target, type, etc.) message may comprise the following fields in particular:
- a "network_id" field comprising a unique identifier of a network, such as an AS number:
  this identifier may be required if a mitigation server (respectively the mobile fleet) is in contact with several networks and the identity of the network to which the target is connected (or the target is part of the network itself) cannot be deduced from the parameters of the security association used to transmit the request;
- a "target" field having the same structure as that of the SOS message of step S-AM 1: this field can be identical to the one received in an SOS message or can be modified by a mitigation server because of the nature of the attack and additional information available to the mitigation server such as network topology or network monitoring data, for example. This field indicates the network node(s) (respectively, the IP resources (for example IP prefix(es))) that require mitigation intervention;
- a "type" field which specifies the type of attack in progress, this information being usable in the phase of selecting a mobile DPS service. The DPS service is based on the definition and implementation of mitigation plans which in particular use fleets of mobile objects in accordance with the development.

Other information can be included in this MITIGATE message, such as a mitigation deadline (immediate or deferred, duration of the intervention, etc.), or other information.

In the next step S-AM5, the server MOB-SM coordinates (possibly with other members of the mobile fleet) the optimal positioning of the mobile fleet so that at least one of the mobile objects (depending on the engineering of the connection of the mobile fleet to the network, the engineering being derivable from the routing policy associated with the mitigation plan) of said fleet can connect to the network NW and the mobile fleet can carry out the mitigation actions. To this end, one will note that it is sufficient for a mobile object to be positioned within radio range of the network node on which it is to intervene.

To obtain the position of the nodes of the network and/or of the mobile objects, the server may have (locally or via an external entity) a location map of the various objects of the fleet (for example GPS coordinates, supported functions, charge, battery state) as well as the location of the nodes (elements) of the protected network. If the network nodes are static, such a location is known to the network operator.

The location map may be supplied by the nodes themselves and/or by the objects of the fleet, by uploading their geographical positions. For this purpose, the mobile objects can carry a GnSS (Global navigation Satellite System) receiver which allows them to indicate their geographical position. The nodes of the network can announce their geographical position by using the resources of a dynamic routing protocol that they activate, such as for example the extensions described for the OSPF protocol in the document by A. Lindem et al. entitled "OSPF Extensions for Advertising/Signaling Geo Location Information", Oct. 18, 2017.

The location map may also be supplied by the neighboring nodes and/or the objects of the fleet neighboring the nodes and objects concerned, which establish adjacency tables for routing requirements. This can be considered for example when one of the nodes requiring mitigation intervention is not able to upload its geographical position. The adjacency tables linked to activation of a dynamic routing protocol provide, for each node (respectively each mobile object), the list of its neighboring nodes and/or of its neighboring mobile objects. By implementing a triangulation technique, it is thus possible to determine the geographical position of the attacked node based on the geographical position of its neighboring nodes and/or neighboring mobile objects, and to dispatch an object of the mobile fleet in proximity to this node.

The mobile fleet is thus connected to the network via one or more mobile objects, and according to one of the embodiments described below with reference to the next main step S-RR ("ATTACHMENT_NETWORK").

In an alternative embodiment of the first main step S-AM1, it is a mobile monitoring fleet which itself detects an anomaly requiring mitigation actions. Three sub-variants are presented below as examples.

Figure 8:
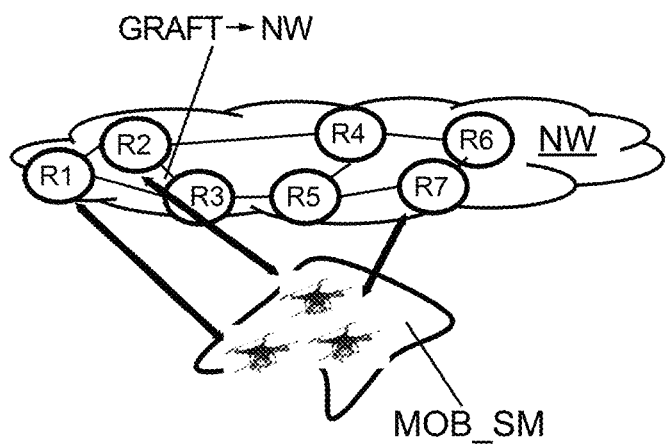
FIG. 8 illustrates an example activation of mitigation triggered from a mobile fleet.

The first sub-variant assumes that the mitigation is ensured by the same mobile monitoring fleet. Thus, with reference to FIG. 8, the fleet decides that a mitigation action is necessary because after analyzing the traffic, the mitigation server MOB-SM in conjunction with this fleet selects at least one mobile object to connect to the network NW. This choice may also result from the decision not to involve another fleet, according to an intervention fleet selection procedure implemented by the mitigation server MOB-SM.

The information for connecting the fleet to the network where the attack was detected is communicated to these objects using what is called a graft procedure ("GRAFT").

The messages associated with the GRAFT procedure (designated here by GRAFT (network_id, list (object_id, list (peer_id), . . . ) messages) include the following information:
- a "network_id" field comprising the identifier of the network to which a mobile fleet must connect. This identifier is not included in a message if there is no ambiguity in the selection of this network (for example, the objects of a fleet are exclusively dedicated to mitigation operations of a single network). This information is typically used for selecting and implementing mechanisms to establish security associations with this network;
- a List(object_id, List(peer_id)) field indicating one or more object identifiers (object_id): each object is typically associated with one or more neighboring nodes (designated by peer_id identifiers), a neighboring node designating a node of the network with which a mobile object must connect. An identifier of an object or neighbor can be structured as an IP address, an alias, a domain name, etc. The object identifier can be omitted if the recipient of the message is the object concerned. The information List(object_id, list(peer_id)) can be omitted if the selection of objects as well as the connection points to the network (nodes) is implemented in a distributed manner (with a conventionally predefined order) by the objects of the fleet. A list of objects is inserted if the message is typically intended for a mobile DPS fleet controller which is then responsible for generating messages intended for the objects concerned. These messages will only include the instructions associated with each object concerned.

Other information may be included in GRAFT messages, such as a connection deadline (immediate or deferred, duration of the connection, etc.), a geographical area, etc.

Next, the fleet is connected to the network as described below with reference to the subsequent main step S-RR ("ATTACHMENT_NETWORK").

Figure 9:
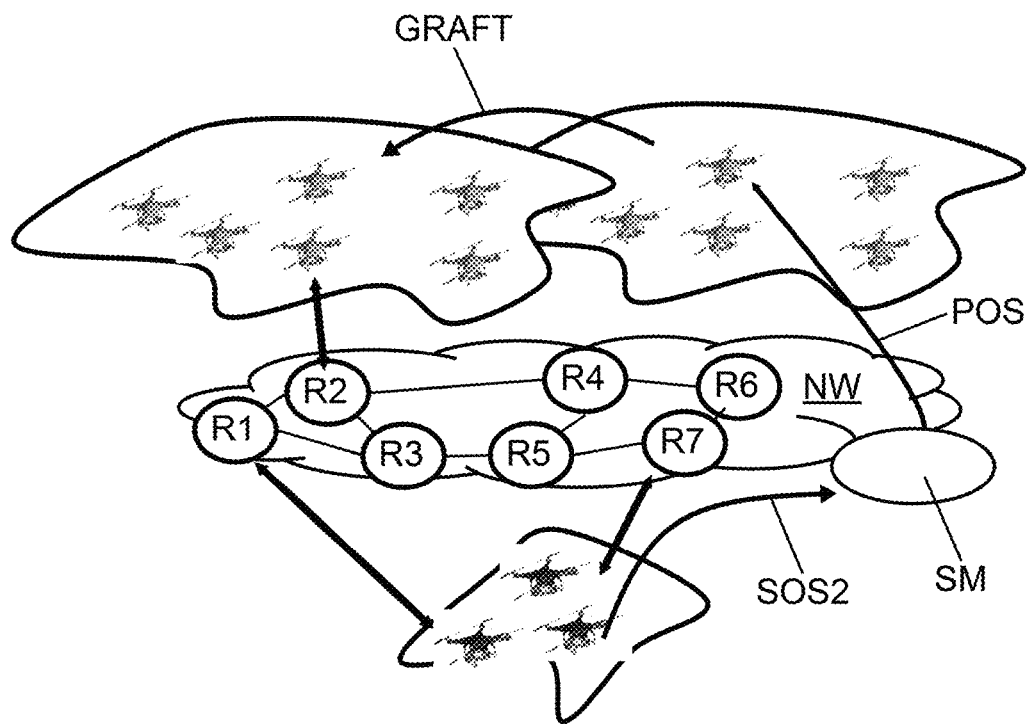
FIG. 9 illustrates an example activation of mitigation triggered from a mobile fleet in a case where the mitigation server is not part of the monitoring fleet.

A second sub-variant assumes that the mitigation is coordinated by a mitigation server external to the monitoring fleet, as illustrated in FIG. 9. The monitoring fleet decides to contact a mitigation server SM after analyzing the traffic and detecting an anomaly, by sending an SOS2 message to this external mitigation server SM. The mitigation server selects a mobile mitigation fleet or even at least one drone of a mobile mitigation fleet (POS arrow) to connect to the network where the attack was detected. The information for connecting the selected mitigation fleet or drone to the network is communicated to them using a GRAFT message as mentioned above. Next, the mobile mitigation fleet connects to the network as described below with reference to the subsequent main step S-RR ("ATTACHMENT_NETWORK").

Figure 10:
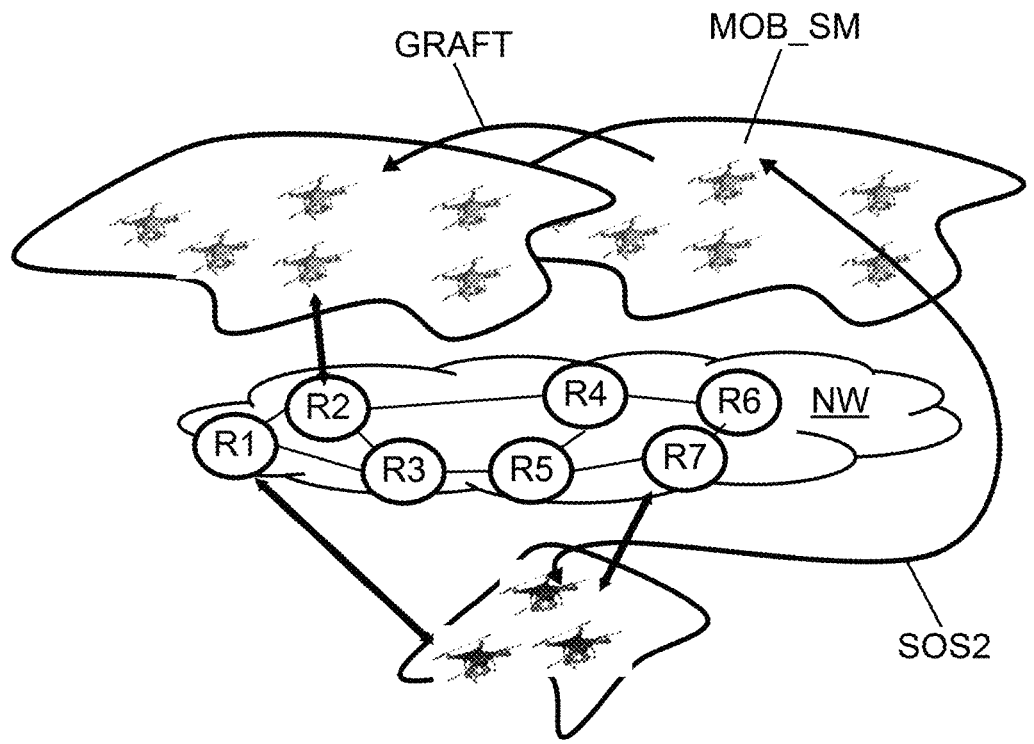
FIG. 10 illustrates an example activation of mitigation triggered from a mobile fleet, requested by the monitoring fleet.

A third sub-variant assumes that the mitigation actions are triggered from another mobile mitigation fleet subsequent to a mitigation request message received from the monitoring fleet as illustrated in FIG. 10. In the example of that figure, a monitoring fleet is responsible for the supervision, analysis, and decision to request another mitigation fleet. An SOS2 message similar to that of FIG. 9 is sent to a mitigation fleet selected by the monitoring fleet for its ability to handle the type of attack observed, according to information about the identification, location of the intervention, and description of the attack, this information being communicated to the mitigation fleet by the monitoring fleet (via a GRAFT message as described above). This mitigation fleet is optimally positioned according to the information communicated in the GRAFT message so that it can connect to the network and carry out mitigation operations. Next, the mitigation fleet connects to the network as described below with reference to the subsequent main step S-RR ("ATTACHMENT_NETWORK").

Figure 11:
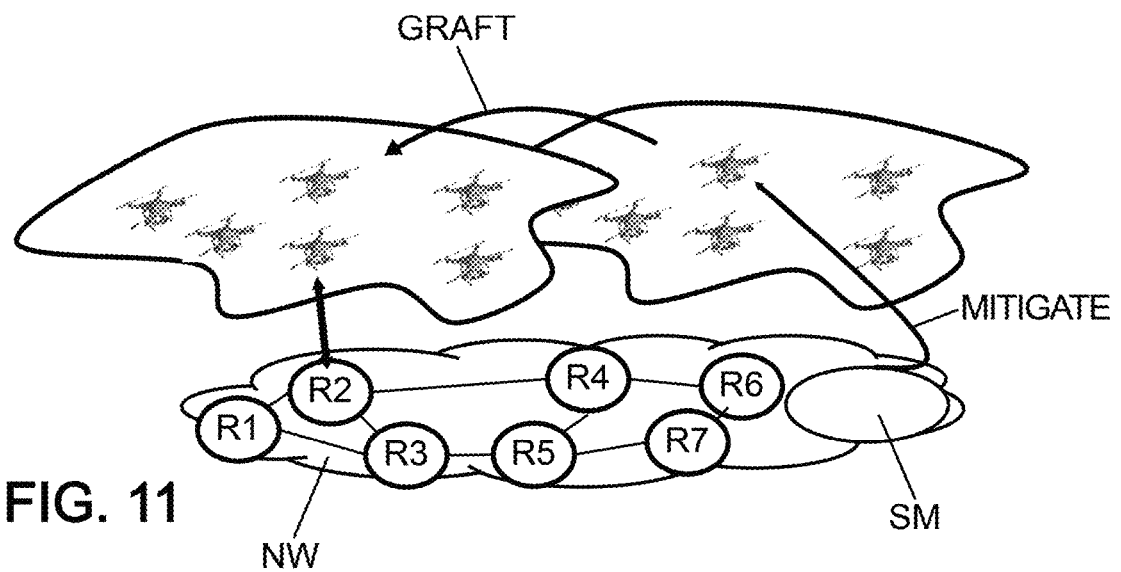
FIG. 11 illustrates an example launching of mitigation actions from a "static" mitigation server (not mobile, not embedded within a drone fleet)

In an alternative embodiment illustrated in FIG. 11, an attack protection service (DPS) decides, on the basis of information provided by means other than an SOS message in particular (for example configuration, monitoring report, or other), to request at least one mitigation fleet. The communications procedures and interactions with the network and its components are identical to those presented above.

Figure 6:
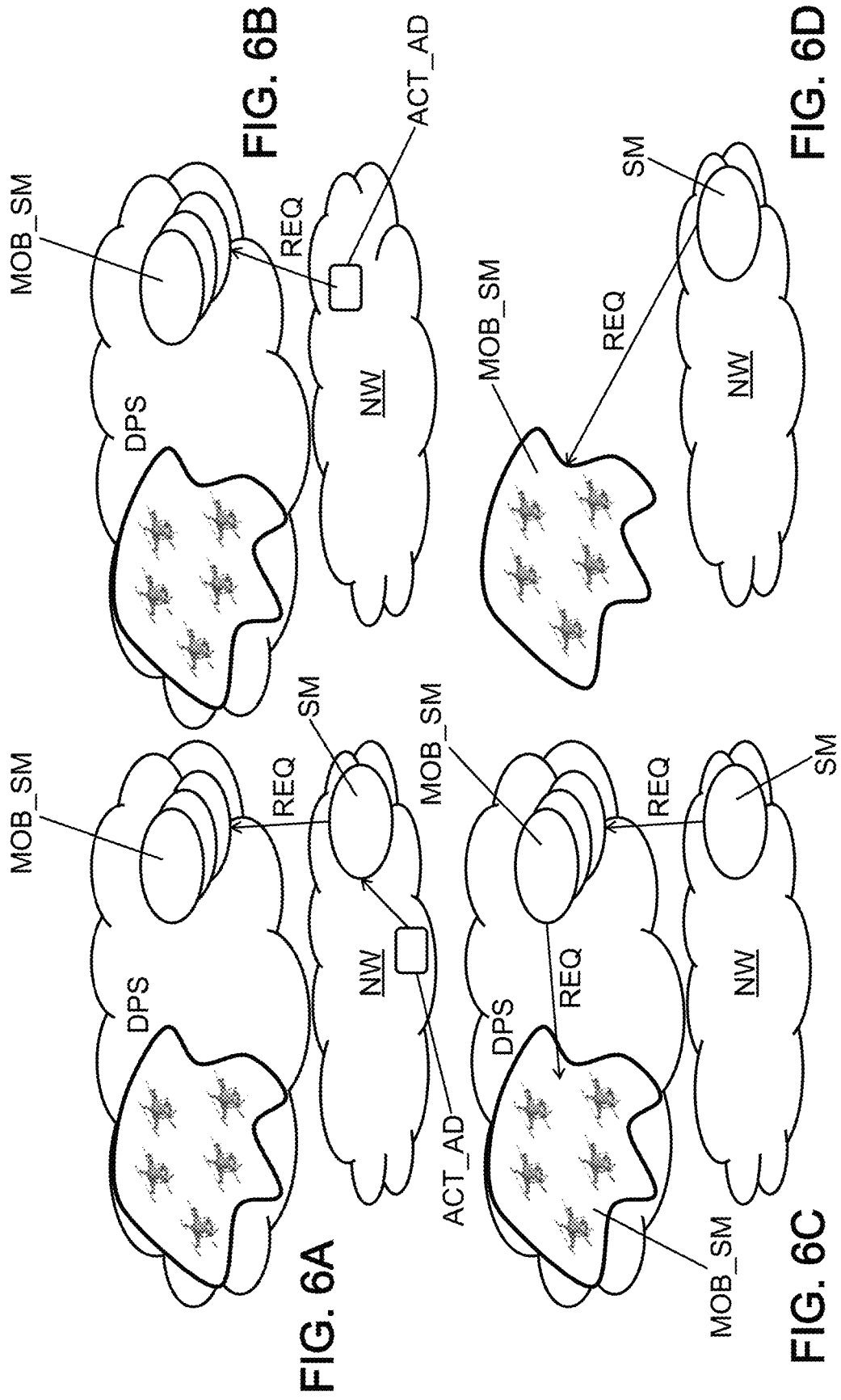
FIG. 6 illustrates different cases (A to D) of examples of possible configurations for implementing the above method.

In addition, the network, and the fleets which protect it (monitoring and/or mitigation fleets), may be operated by the same operator or by separate operators. FIG. 6 illustrates some example implementations:

the DPS service as well as the network are operated by the same entity and the mitigation is managed by the mitigation server SM of the network NW (the case in FIG. 6D), or the network supports a local DPS service implementing a mitigation server SM, which interfaces with another external DPS service implementing a mitigation server MOB-SM linked with the fleet (case in FIG. 6A and FIG. 6C), or the network exclusively uses a third-party DPS service (case in FIG. 6B), with no mitigation server SM for the network NW, yet other configurations also being possible.

Thus, with reference to FIG. 25, the first main step S-AM can be summarized for example as follows:

(active) network security agents ACT-AD can identify suspicious traffic. In this case, the agents ACT-AD indicate (possibly indicate, because the mitigation server can also determine this information based on the location of the agent in the network) the nodes of the network NW which are under attack or are susceptible to attack, the nodes to be protected, or sources of an attack, in an SOS message to a mitigation server SM known to the active agents, the mitigation server SM decides whether the suspicious traffic is indeed a confirmed attack, and, if it is not linked with a mobile mitigation fleet, selects a mitigation server MOB-SM that is linked with (or part of) such a mobile fleet, and sends it a mitigation request message REQ which may include some of the data from the SOS message, the mitigation server MOB-SM which is linked with (or part of) the mobile mitigation fleet then triggers the mitigation operation and in particular defines, based on the data of the REQ message, the appropriate mobile objects (e.g. drones) and appropriate positions POS of these mobile objects relative to the nodes of the network NW under attack and/or to be protected (nodes to be protected typically can be strategic nodes of the network NW), the mitigation server MOB-SM which is linked with (or part of) the mobile mitigation fleet then sends (directly or via a controller) one or more GRAFT messages to said appropriate mobile objects, these GRAFT messages indicating in particular the positions that the appropriate mobile objects must occupy in order to connect to one or more target nodes of the network requiring intervention.

In particular, the geographical position of a mobile object such as a drone connecting to a node of the network is chosen so that it has a direct link (a radio link, for example) with this node without passing through an intermediate node which itself could be at risk of attack.

Referring again to FIG. 25, a general method within the meaning of the development may also comprise a second general step S-RR of connecting to the network, for example. This is a step of connecting to the network because, in order to set up mitigation actions, a fleet of mobile objects can be dispatched to an area and connect to the network according to one of the two modes described below.

The chosen location in the network for connecting the fleet takes into account several criteria such as:

being as close as possible to the source of an attack,
being as close as possible to a victim of the attack,
protecting a strategic node,
or other criteria.

These criteria can be taken into account in order to identify:

(1) the node(s) of the network which require(s) mitigation intervention, and
(2) the routing policy of the mitigation plan.

The GRAFT message (presented above) is used to communicate to a mobile object the command to connect to a network, while a message called CEASE (network_id, list (local_node_id, list(peer_id)), . . . ) is used to command an object to disconnect from a network, as will be seen below particularly with reference to the S-DESAC step.

The arguments provided in a CEASE message are similar to those of a GRAFT message but:

this message can be sent to or from a network node, and this message only concerns disconnection operations.

Furthermore, a message called POLICY is used to communicate to an object a set of instructions characteristic of the implementation of mitigation measures adapted to the nature of the attack. This could be for example:
- a command to the moving object to move to a new position,
- carrying out specific processing (for example tagging, repackaging, destruction, etc.) of all or part of the traffic redirected via the fleet,
- adding an entry in a FIB ("Forwarding Information Base") or a RIB ("Routing Information Base") maintained by the nodes of the network and/or the mobile objects. Such tables allow the nodes and mobile objects to record in particular the routes that allow traffic to be routed to a particular destination,
- commanding an activation or an update of an ACL ("Access Control List") filter, etc.

The POLICY message can also be used to interact with network nodes, from the fleet.

The structure of the POLICY(network_id, list(object_id, list(action)), . . . ) message is based on the following information:
- a "network_id" field which has the same meaning as the "network_id" field provided in the GRAFT message. This information is not necessary when the POLICY message is intended for a network node or a mobile object connected to a single network.
- a list(object_id, list(action)) field indicates one or more object identifiers (object_id); each object is typically associated with one or more mitigation actions. A mitigation action can be a filtering rule, installation of an entry in the FIB/RIB, configuration of a traffic load distribution policy, new positioning, etc. An object identifier can be structured as an IP address, an alias, a domain name, etc. The object identifier can be omitted if the recipient of the message is the object concerned. A list of objects is inserted if the message is typically intended for a controller of a mobile DPS fleet which is then responsible for generating the messages intended for the objects concerned (and these messages only include the instructions associated with each object, for example).

Other information/instructions may be included in the POLICY message, such as a time frame for applying the policy (immediate or deferred, etc.).

The examples below assume that the mitigation actions consist of extending the capacity of a node of the network (in other words of its resources), or even partially bypassing a node or a segment of the network. However, the connection modes apply for other types of mitigation actions, such as those described in the general main step S-ACT of FIG. 25 (relating to "ACTIONS_MITIGATION").

The extension of capacity may be local or "parallel" (also called "bypass" below).

In local extension mode, the connection of the mitigation fleet to the network is carried out locally by the node identified in the connection command sent by the mitigation server in a GRAFT message.

After identifying an incident which requires the intervention of a fleet of mobile objects in order to initiate mitigation actions, a command (GRAFT) is sent to the fleet by the mitigation server telling it to position itself in the affected area, if necessary. Then the fleet connects to the network element indicated in the GRAFT message. Information for establishing a secure communication (for example certificates, secret keys, hashes, encryption algorithms, etc.) between the node and the fleet may also be communicated via secure channels. Commands communicated to one or more mobile objects to position themselves in the area concerned, as well as commands communicated to one or more mobile objects telling them to connect to the network, may be formulated directly by the fleet (for example by a mitigation server embedded within the fleet) after detection of an anomaly, or formulated upon receipt of a MITIGATE or SOS or SOS2 message sent by one of the network nodes.

Figure 12:
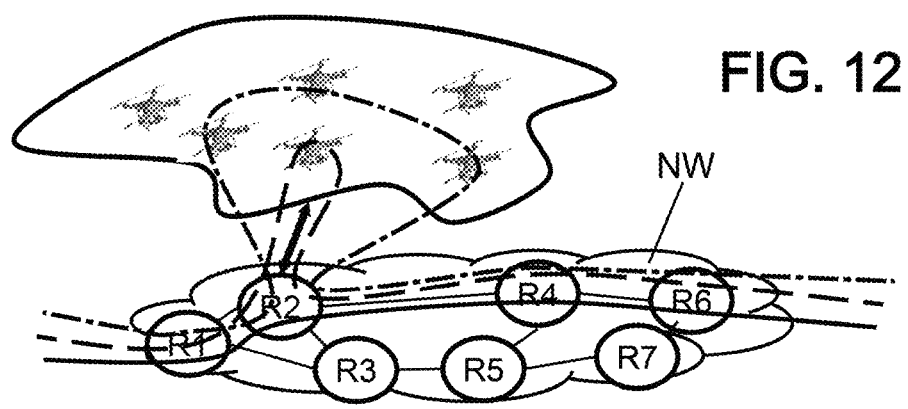
FIG. 12 illustrates an embodiment of extending the local capacity by the use of a drone.

Once the connection to the network is established, and referring to the example of FIG. 12, the fleet of mobile objects (i.e. drones here) is considered as an extension of the capacity (memory, processing means (processor, working memory, etc.), bandwidth, or others) of the suspicious network node (denoted "R2" in the figures where it is represented).

Several strategies can thus be adopted for the distribution of traffic between node "R2" and its extension provided to it by the mobile mitigation fleet. These strategies can be configured beforehand on R2 by the network operator in the form of policies (for example such as ECA ("Event-Condition-Action")). These could be, for example:
- an "event" such as exceeding a traffic threshold on one of the interfaces of R2,
- a "condition" defined according to the destination address of the traffic, and
- an "action" consisting of redirecting the associated traffic to the fleet of mobile objects.

These policies are then communicated by the fleet of mobile objects to R2 during the connection step S-RR via the POLICY message.

During mitigation operations, the traffic can be processed locally at "R2" or be redirected wholly or in part to the fleet of mobile objects for processing. The redirection is local to R2 (for example according to "Match-Action" instructions, using a load distribution of x % via R2 and (100–x) % via the fleet). The following example illustrates an ECA rule where R2 is instructed, possibly using the POLICY message, to redirect all traffic destined for an attack target having the identifier "1.2.3.0/24", to the fleet.

```
"Event" : Activation-Interface-Fleet {
    {
        "Condition" : Dest_Prefix=1.2.3.0/24,
        "Action" : Redirect-via-Fleet_any
    }
}
```

Figure 13:
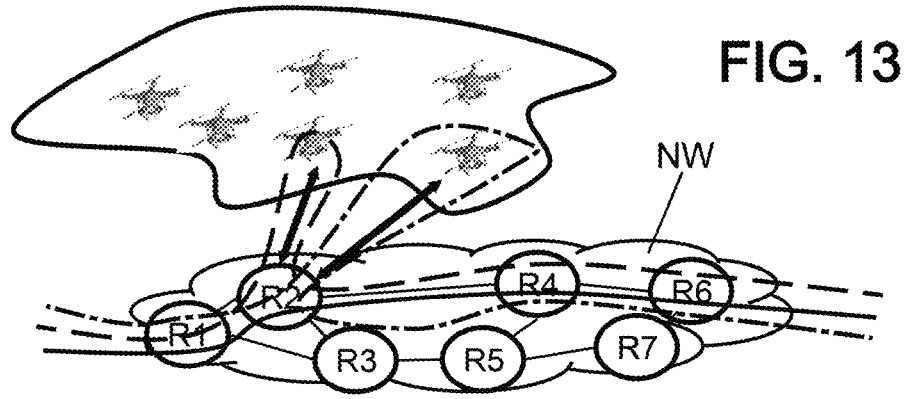
FIG. 13 illustrates an alternative embodiment of extending the local capacity, relative to FIG. 12.

One or more mobile objects can be called upon when the traffic is redirected to a fleet of mobile objects. The selection of the mobile object ("ingress", entry point into the fleet) can be made by element R2 according to several modes, such as those illustrated as examples in FIGS. 12 and 13 respectively.

An example of actions communicated to R2 in a POLICY message for the selection of drones to be called upon for mitigation operations is given below: "drone1" is chosen if the traffic is intended for node 1.2.3.0/24, while "drone2" is chosen for the redirection of traffic intended for node 2.3.4.0/24.

```
"Event" : Activation-Interface-Fleet {
    {
        "Condition" : Dest_Prefix=1.2.3.0/24,
        "Action" : Redirect-via-Fleet_drone1
    },
    {
        "Condition" : Dest_Prefix=2.3.4.0/24,
        "Action" : Redirect-via-Fleet_drone2
    }
}
```

Once the mitigation action has been carried out by the fleet, legitimate traffic can for example be rerouted to R2, which then processes it according to nominal network routing rules.

Figure 14:
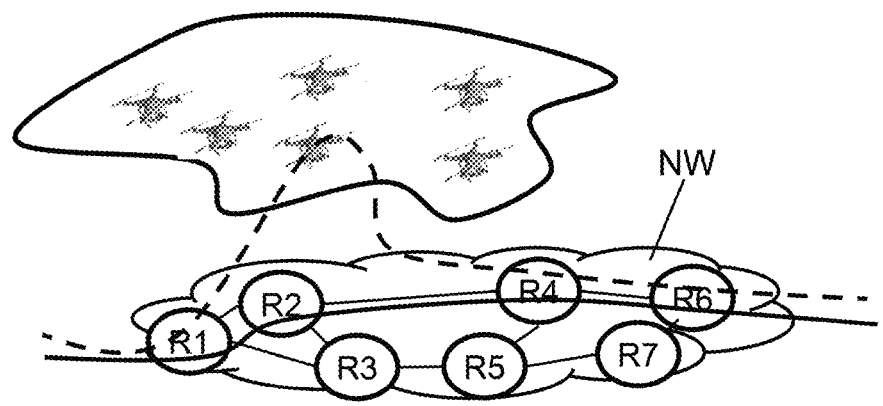
FIG. 14 illustrates an embodiment of extending the capacity in "parallel" or "bypass" mode, an alternative to the mode illustrated in FIGS. 12 and 13.

In the so-called "parallel" or "bypass" extension mode, the connection of the mitigation fleet to the network is carried out without involving the node that is the victim of an incident or an attack (R2 in FIG. 14, for example). R2 in this example is the attacked node which requires mitigation intervention.

Thus, after identifying an incident or an attack which requires the intervention of a mitigation fleet in order to carry out one or more mitigation action(s), an order is sent to the mitigation fleet by the mitigation server telling it to position itself as close as possible to the area concerned, if necessary (via a POLICY message). Next, the fleet connects to the network nodes indicated in the GRAFT message (these nodes here are then different from the attacked node R2 concerned by the mitigation intervention). Typically, two nodes (ingress, egress) are indicated per direction of traffic ("incoming" and "outgoing"). The same ingress and egress nodes can be specified for both directions (and thus the ingress node for outgoing traffic is considered to be the egress node for incoming traffic).

Once the connection of the mitigation fleet to the network is effected (in other words here between the mitigation fleet and the (ingress, egress) nodes R1 and R4), and referring to the example of FIG. 14, the fleet of mobile objects is seen as extending the capacity of node "R2" which suffered the attack and required intervention.

Several strategies can be adopted by R1 and R4 for the distribution of traffic between "R2" and its extension (resulting from the fleet of mobile objects), depending on the nature of the mitigation action to be performed for example. These policies can be configured beforehand on R1 and R4 by the network operator in the form of ECA ("Event Condition Action") policies, communicated by the fleet of mobile objects to R1 and R4 using POLICY messages. During mitigation operations, traffic may be sent directly to "R2" or may be redirected to the fleet of mobile objects for processing. The redirection is local to R1 and R4 (for example, according to "Match-Action" instructions, indicating a load distribution of x % via R2 and (100−x) % via the fleet).

The following configuration shows an example of policies communicated to R4 for the selection of incoming traffic to be redirected to the fleet for mitigation purposes: all UDP traffic with a destination having the prefix 1.2.3.0/24 and having port number 443 is redirected to the fleet; the rest of the traffic is routed according to the nominal route. Other strategies may be adopted by R1 and R4 depending on the nature of the attack.

```
"Event" : Activation-Interface-Fleet {
    {
        "Condition" : {
            "Dest_Prefix" =1.2.3.0/24,
            "Protocol" = udp,
            "Dest_Port_number" = 443
        },
        "Action" : Redirect-via-Fleet_any
    }
}
```

In addition, the following configuration shows the example of policies communicated to R1 for the selection of outgoing traffic to be redirected to the fleet in order to carry out mitigation actions: all UDP traffic sent from prefix 1.2.3.0/24 is redirected to the fleet; the rest of the traffic is routed according to the nominal route.

```
"Event" : Activation-Interface-Fleet {
    {
        "Condition" : {
            "Src_Prefix" =1.2.3.0/24,
            "Protocol" = udp
        },
        "Action" : Redirect-via-Fleet_any
    }
}
```

One or more mobile objects can be called upon when the traffic is redirected to a fleet of mobile objects. Selection of the "ingress" mobile object (as entry point) can be made by nodes R1 and R4 according to several modes similar to those of R2 illustrated by any of FIGS. 12 and 13.

Within a context of extending the capacity, once the processing has been carried out by the fleet, the traffic is rerouted to R2 which then processes it according to the nominal routing rules of the network. Other actions can be applied (typically: blocking traffic).

Thus, with reference to FIG. 25, the main step S-RR can be summarized for example as follows:
- a drone i, positioned near a node Rj (by means of the GRAFT message received from the mitigation server), can offer this node Rj additional resources corresponding to "extending the capacity" (EXT CAPA), by connecting:
  directly to this node Rj, in local extension mode, or,
  to one or more nodes neighboring this node Rj, in parallel or bypass mode (two nodes R1 and R4 in the example of FIG. 14, or even a single node in the particular case of FIGS. 20-21) without being connected to this node Rj;
- once connected (CONNECT) to this node Rj, the drone i can secure the exchanges by encrypting them (SECUR), in accordance with the policy previously defined by the POLICY messages;
- in fact, the mitigation server MOB-SM linked with (or embedded within) the fleet sends POLICY messages beforehand:
  to the mobile objects of the fleet which intervene to protect the network NW (in addition to GRAFT messages), and
  to the nodes Rn, . . . , Rk remaining active in the network NW,
  in order to define the appropriate traffic rules for mitigating the attack (these rules can be defined by ECA policies each adapted to a mobile object or to a node or to a set of mobile objects and nodes).

With reference to FIG. 25, for the implementation of the next general step S-ACT of setting up mitigation actions (ACTIONS_MITIGATION), several variants are possible. Indeed, for the application of the mitigation service by a fleet of mobile objects, the policies for connecting fleets of mobile objects to the network described above are not repeated here. Also, the examples relating to extending the capacity are not illustrated.

Figure 15:
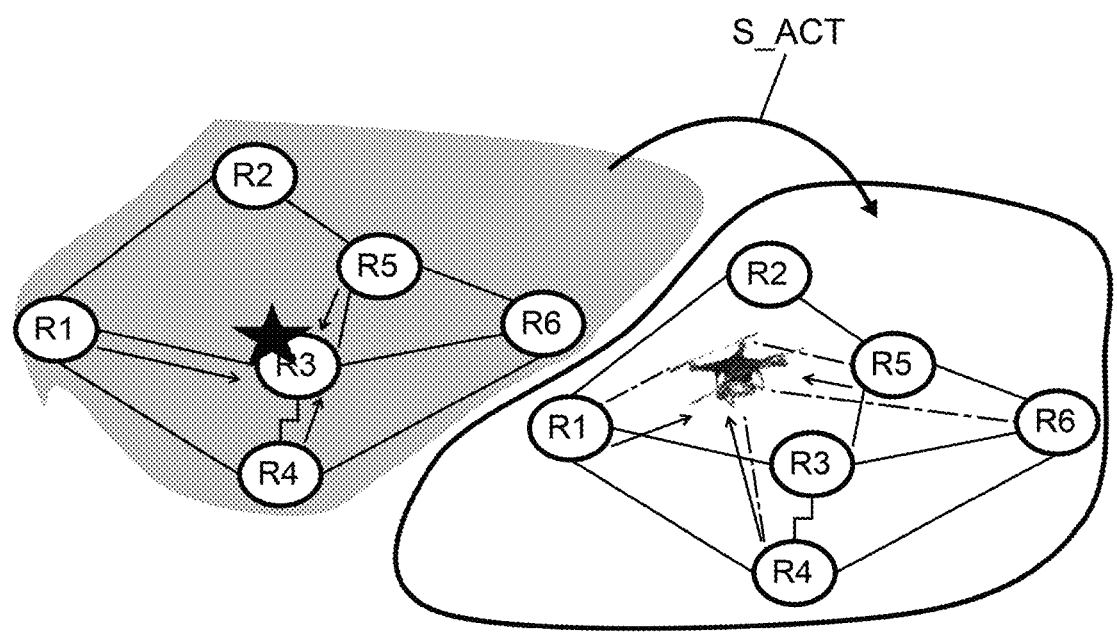
FIG. 15 illustrates an example of mitigation with the intervention of a single drone.

FIG. 15 illustrates the example of a mitigation action which consists of replacing a node of the network which is under attack (denoted R3 in FIG. 15). A mobile object (e.g. a drone) of a mitigation fleet has been ordered to connect according to the procedures described above. It thus establishes connections with all neighbors of R3. POLICY messages are then sent to R1, R4, R5, and R6 so that they redirect traffic to this mobile object and deactivate their communication interfaces to R3. In doing so, a software update, installation of a security patch, etc. can be performed while preserving continuity of service (legitimate traffic is redirected to the mobile object during the time the failed node R3 is being restored to its nominal operation). In some cases, the mitigation intervention on R3 can be carried out via the mobile object itself. In this case, the mobile object also connects to R3; this order is received via a POLICY message (and not via the GRAFT message).

Figure 16:
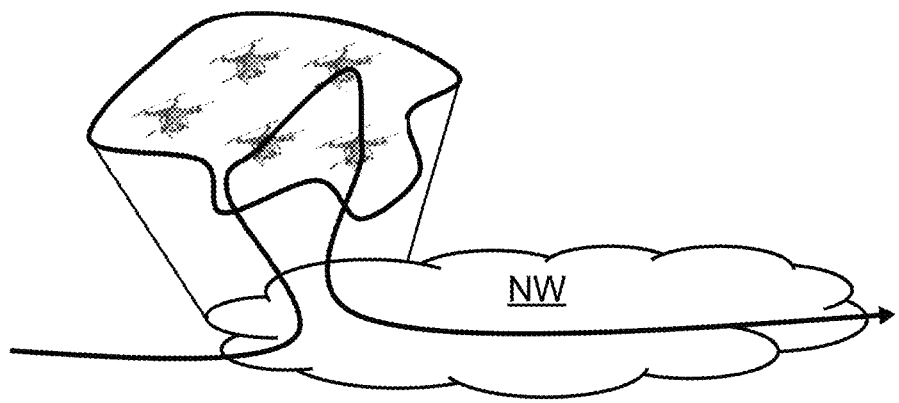
FIG. 16 illustrates an example of filtering suspicious traffic within the network NW by mobile "scrubbing"
Figure 17:
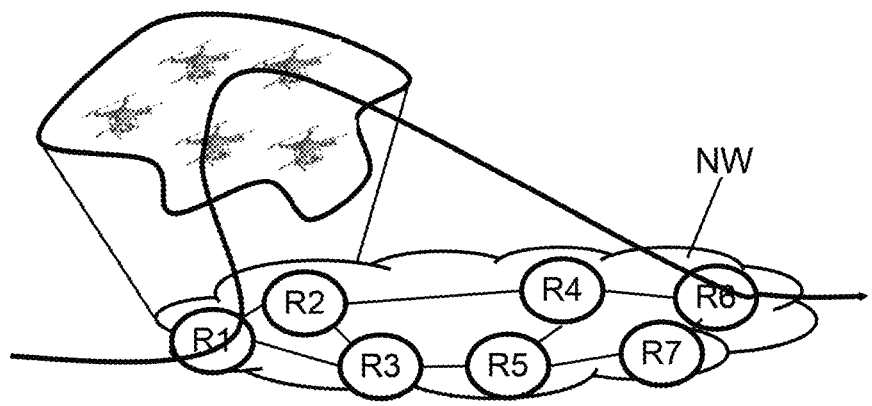
FIG. 17 illustrates another example of traffic redirection within the network NW by mobile "scrubbing"

The example of FIG. 16 illustrates another example of a mitigation action and more particularly the activation of a policy of intercepting suspicious traffic as close as possible to the source at the origin of the DDoS attack. Thus, all or part of the traffic is redirected to the fleet of mobile objects which has embedded DDoS inspection and mitigation functions. These functions may be distributed among several mobile objects (e.g. drones). Non-suspicious traffic is reinjected into the nominal network while DDoS traffic is suppressed. The characteristic metadata of the attack are recorded by the fleet for subsequent analysis of the dynamics of the attack (amplitude, duration, type of traffic, etc.) and to define the preventive measures to be applied to prevent similar attacks on the network from recurring. Legitimate traffic is injected by grafting into the same node or into a node in the network different from the one used to intercept the traffic. Selection of the node for reinjecting legitimate "egress" traffic is a decision of the fleet which takes into account the load of the node that has undergone the DDoS attack (for example), compensation for the processing delay within a DPS mitigation server linked with the mobile fleet, or even the number of IP hops on the nominal path (as illustrated by way of example in FIG. 17, where the number of hops of the nominal path—four (R1-R2-R4-R6)—is identical to that used via the mobile fleet (R1—two drone hops—R6)), etc.

Figure 18:
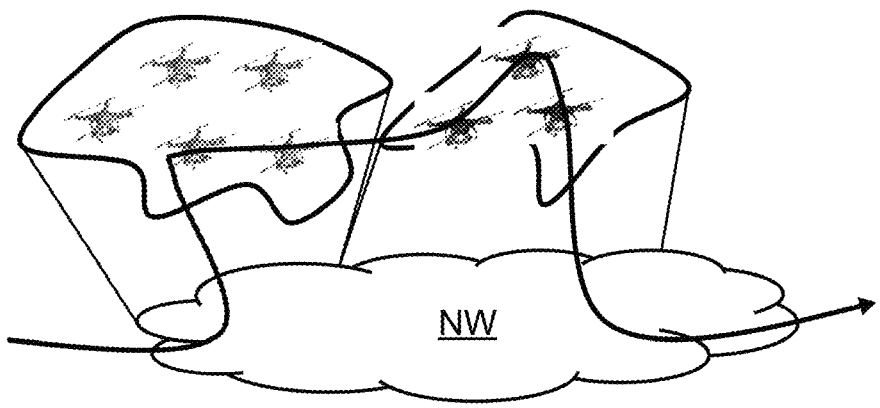
FIG. 18 illustrates an example of the cooperation of several fleets to route traffic during a security incident.

Another variant is illustrated in FIG. 18, where two fleets of mobile objects (drones) are involved in processing and routing legitimate traffic. This variant can be implemented, for example, when several nodes of a network have undergone an attack (infection of an operating system (OS) for example). This being the case, the network operator allows itself the time necessary to investigate and to apply corrections without disrupting the service.

Figure 19:
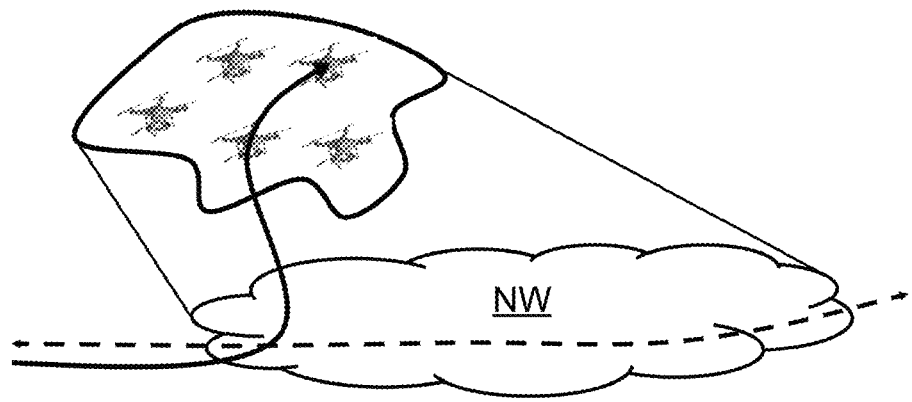
FIG. 19 illustrates an example of an interception of unwanted traffic—"offloading"

FIG. 19 illustrates yet another variant, in which traffic selection policies are programmed into a node of the network. Legitimate traffic is routed according to the nominal rules, while suspicious traffic is redirected to a fleet of mobile objects (drones) which analyzes it and blocks the DDoS traffic. In addition to ensuring continuity of service, this variant has the advantage of optimizing the use of network resources because DDoS traffic is not routed by this network but blocked "upstream".

Figure 20:
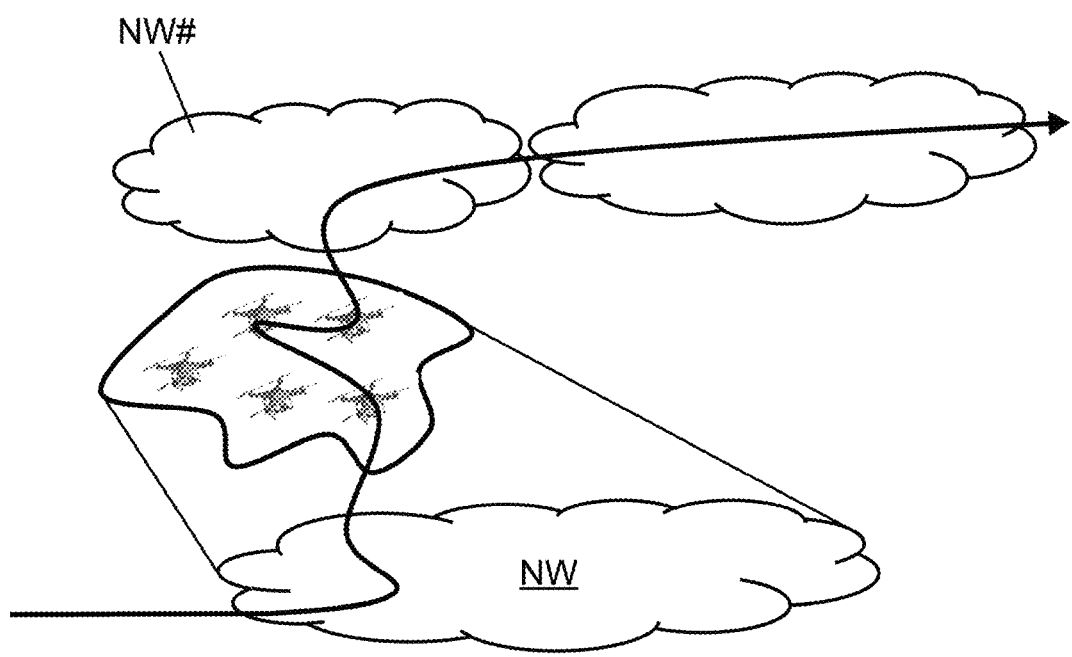
FIG. 20 illustrates an example of an intervention to route outgoing traffic from the network NW.
Figure 21:
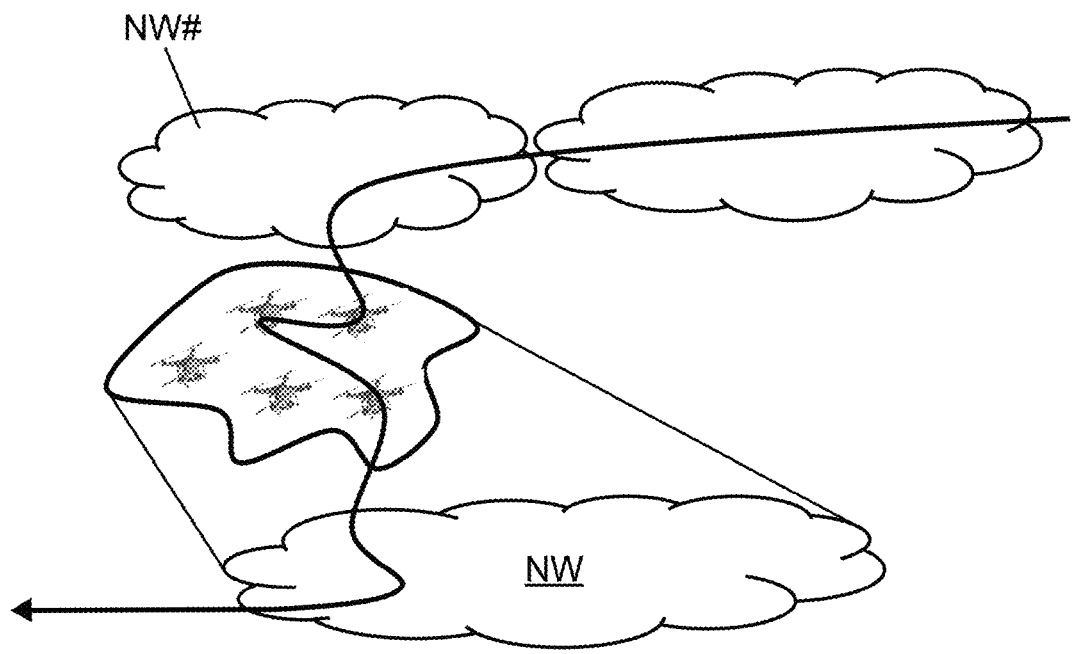
FIG. 21 illustrates an example of an intervention to route incoming traffic to the network NW.

FIGS. 20 and 21 show examples of policies applied to incoming or outgoing traffic to bypass one or more nodes of the network subsequent to a denial of service attack generated by a node located in the network to be protected. The mission of the fleet of mobile objects is to intercept legitimate traffic and route it to the Internet (FIG. 20, outbound traffic) or to machines connected to the network NW (FIG. 21, inbound traffic). Interception of inbound traffic assumes that specific routes are announced by the fleet of mobile objects and denoted NW # in order to be able to receive traffic destined for the target network NW or this latter network NW does not announce these routes to its neighbors. These routes are therefore more specific than those announced by the network NW, to guarantee their selection.

With reference to FIG. 25, step S-ACT can then be summarized for example as follows. The mobile objects involved ensure that:

suspicious DDoS traffic is blocked and filtered for example, and/or the nodes concerned (suspicious and/or to be protected) Rj of the network NW are replaced with backups for example (in bypass mode or other), the nominal traffic can continue to be routed securely (denoted "Route trafic" in FIG. 25 in step S-ACT).

With reference to FIG. 25, the next general step S-DESAC concerns for example a disconnection (DEACTIVATION) in order to terminate mitigation operations via a mitigation fleet. Several variants are possible for terminating the mitigation operations undertaken by a fleet and for disconnecting this fleet from the network to be protected. The CEASE and POLICY messages introduced above are used for this purpose.

In the embodiment described here, the security agents ACT-AD embedded in the network decide, after analyzing the traffic, that the attack is no longer active. One of these agents contacts for example the mitigation server MOB-SM linked with or embedded in the fleet in order to ask it to end the mitigation operations and to disconnect (via a CEASE message). The mitigation server MOB-SM can either accept the request immediately or ask to keep the mitigation action active for an additional period of time because the mitigation fleet is still detecting DDoS traffic in the analyzed traffic. A message called WAIT(reason, timer, . . . ) for example is then sent by the fleet to said agent, with the following fields:

a "reason" field indicating the reason why the disconnection request is to be deferred, and a "timer" field indicating a deadline after which the same request can be resent, the mitigation operations being maintained in the meantime.

After analyzing the traffic redirected to the mobile fleet, the fleet can decide to coordinate the disconnection of the service from the protected network. To do this, the mitigation server MOB-SM communicates for example to the ingress/egress nodes of the network the new policies for processing suspicious traffic, in a POLICY message. An example policy is described below where all UDP traffic originating from 1.2.3.0/24 can now be routed along the nominal path, as follows:

```
"Event" : Deactivation-Interface-Fleet {
    {
        "Condition" : {
            "Src_Prefix" =1.2.3.0/24,
            "Protocol" = udp
        },
        "Action" : local_default_forwarding
    }
}
```

After activation of the new policies, the nodes of the protected network as well as those of the fleet disconnect. Mobile objects in the fleet disconnect after receiving a CEASE message.

With reference to FIG. 25, this last main step S-DESAC can therefore be summarized for example as follows:
- one of the security agents ACT-AD of the network can determine that the attack is no longer active and can contact the mitigation server MOB-SM linked with (or embedded within) the fleet, in order to end the mitigation;
- the mitigation server MOB-SM linked with (or embedded within) the fleet checks whether the attack is still active (for example by probing the mobile objects involved in the mitigation intervention to determine whether they are still detecting suspicious traffic, by consulting the state of progress in the execution of a "scrubbing" function), and if such is the case, sends a WAIT message to the security agent ACT-AD, and if not, sends a CEASE message to the mobile objects involved in the intervention (or, prior to this step, sends POLICY messages describing the traffic management policies which aim to gradually stop the routing of traffic by the mobile objects).

Figure 22:
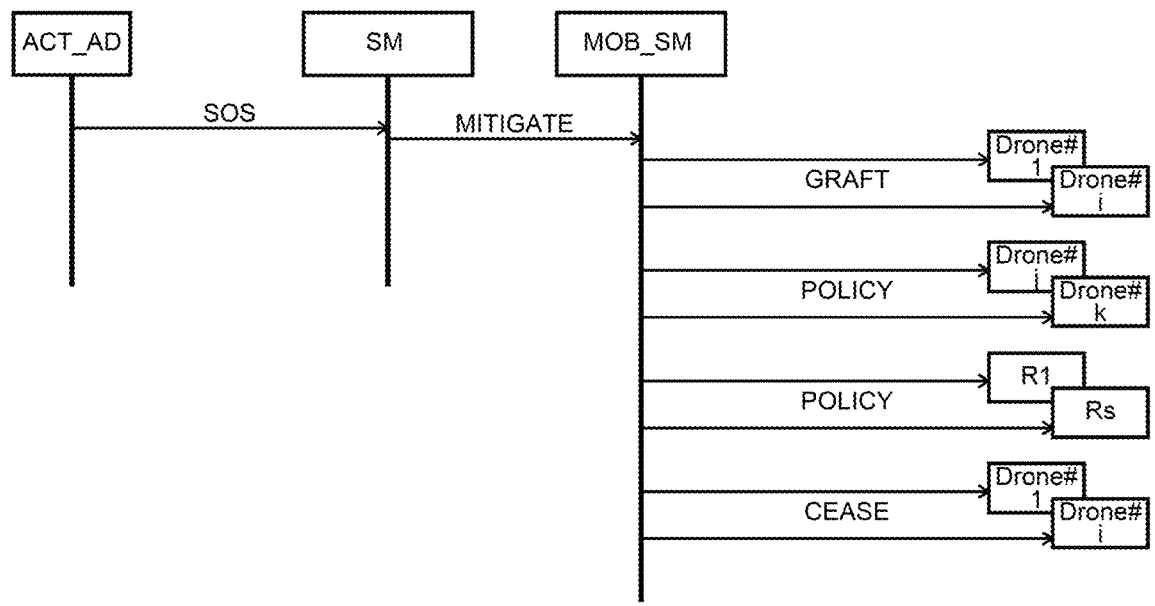
FIG. 22 illustrates an example exchange of messages to implement mobile mitigation operations.

FIG. 22 and beyond summarize the messages exchanged between the various entities in the entirety of the above method.

In the particular example of FIG. 22, it is assumed that a security agent ACT-AD is the initiator of the mitigation request. This agent sends an SOS message to the mitigation server SM (located in the network NW or externally, as we have seen above). This mitigation server SM decides to call upon a mobile DPS service by sending a mitigation request message to one of the mitigation servers MOB-SM of the mobile DPS service, in the example illustrated. One of these servers takes charge of the request and decides to connect a mobile fleet to the network NW using several mobile objects, in this case several drones (Drone #1, . . . Drone #i); connection instructions are communicated to these drones using GRAFT messages. Similarly, this mitigation server MOB-SM decides on the repositioning actions for certain drones or even configuration modifications. POLICY messages are sent to some or all of the drones in the mitigation fleet (Drone #j, . . . Drone #k). Note that some drones of the first group (Drone #1, . . . Drone #i) can also receive POLICY messages. No constraint is imposed on the order in which the POLICY and GRAFT messages are sent. Once the connection is established with the network NW, the mitigation server MOB-SM can communicate instructions to the nodes R1, . . . , Rs of this network NW. Depending on the progress of the attack and the mitigation actions, the mitigation server may decide on new mitigation actions to be executed by the objects of the fleet or the nodes of the protected network. The mitigation server can end the procedure by ordering the drones (Drone #1, . . . Drone #i) to disconnect from the network using CEASE messages.

Figure 23:
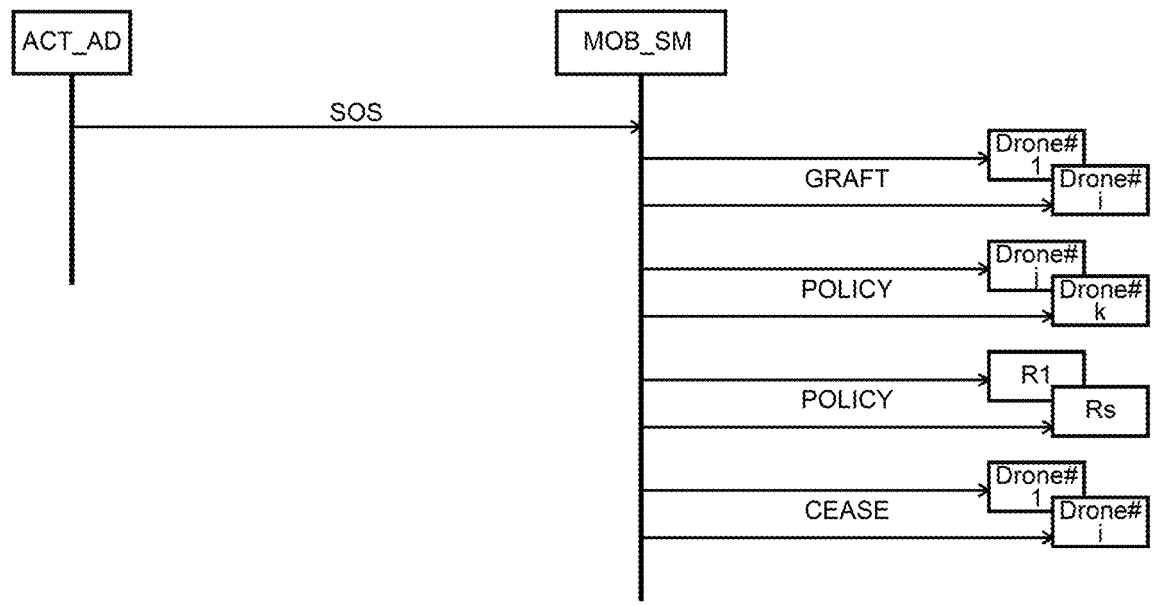
FIG. 23 illustrates an alternative example exchange of messages to implement mobile mitigation operations.

Unlike the example of FIG. 22, the example of FIG. 23 assumes that the mitigation server MOB-SM which receives the SOS message is the one which is able to decide which drones should be connected to the network, which ones should reposition themselves, etc. The sequence of operations is identical to those in FIG. 22.

Figure 24:
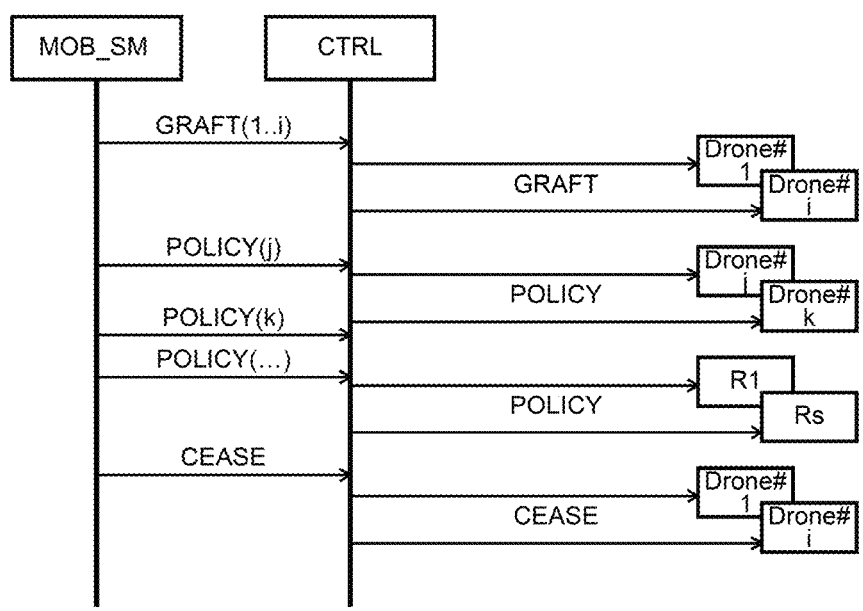
FIG. 24 illustrates yet another example exchange of messages, here via a fleet controller, and FIG. 25 summarizes the main steps of an example method within the meaning of the development.

The commands sent to a fleet of mobile objects by a mitigation server may be sent individually to the mobile objects of a fleet or may be relayed by a fleet controller CTRL which is also one of the mobile objects of the fleet. This embodiment is illustrated by FIG. 24. The instructions sent to the controller CTRL may be aggregated, like the GRAFT message (typically instructions targeting several mobile objects are communicated in the same message), or may not be (like the POLICY messages). In this case, the controller is responsible for extracting (and supplementing) the instructions relating to each mobile object. The exchanges upstream of the mitigation server MOB-SM can be similar to those exchanged upstream of the server MOB-SM of FIG. 22 or to those exchanged upstream of the server MOB-SM of FIG. 23.

The invention claimed is:

1. A method for managing assistance to a communication network capable of routing traffic characteristic of a computer attack of a denial-of-service type, the method comprising:
   upon detecting a computer attack, identifying at least a first node of the network, requiring mitigation intervention, and identifying a traffic routing policy in the network;
   providing at least one mobile object comprising at least one communication interface for connecting to at least one node of the network;
   controlling a movement of the mobile object so as to connect the mobile object to at least a second node of the network determined relative to the first node according to the traffic routing policy; and
   controlling at least part of the traffic routed by the network, so as to redirect the part of the traffic to the mobile object via at least the second node of the network,
   wherein the mobile object is configured to analyze and filter at least the part of the traffic redirected to the mobile object,
   and wherein the movement of the mobile object is remotely controlled to approach a geographical position of the second node.

2. The method according to claim 1, wherein the second node corresponds to the first node.

3. The method according to claim 1, wherein a plurality of mobile objects is provided, each comprising at least one communication interface for communicating at least between mobile objects, and a first mobile object among the plurality of mobile objects is controlled so as to connect to at least the second node of the network.

4. The method according to claim 3, wherein the identification of the first node of the network and of the traffic routing policy in the network is carried out by a mitigation server embedded in one of the mobile objects.

5. The method according to claim 3, wherein the computer attack is detected by a second mobile object, connected to the network.

6. The method according to claim 1, wherein the computer attack is detected by the mobile object, controlled to connect to at least the second node.

7. The method according to claim 1, wherein the computer attack is detected by a third node of the network.

8. The method according to claim 1, wherein the mobile object is equipped with a processing circuit comprising computing resources providing computing capabilities for processing at least the part of the traffic redirected to the mobile object.

9. The method according to claim 1, wherein the mobile object is configured to establish communication by radiofrequency link in order to connect to at least the second node.

10. The method according to claim 1, comprising:
sending a graft message to the mobile object, in order to command a movement of the mobile object and establish a connection of the mobile object to the second node, designated in the graft message;
sending a routing policy message to the mobile object, in order to command at least one traffic routing rule for routing by the mobile object; and
sending a routing policy message to at least the second node, in order to command at least one traffic routing rule for routing by the second node.

11. The method according to claim 10, wherein the sending of the messages is performed by at least one mitigation server linked with the mobile object.

12. A non-transitory computer storage medium, storing instructions of a computer program, causing implementing the method according to claim 1, when the instructions are executed by a processor.

13. A system for managing assistance to a communication network capable of routing traffic characteristic of a computer attack of a denial-of-service type, the system comprising at least:
a mobile object comprising at least one communication interface for connecting to at least one node of the network;
a mitigation server configured for, in response to detection of a computer attack:
identifying at least a first node of the network, requiring mitigation intervention,
identifying a traffic routing policy in the network,
controlling a movement of the mobile object so as to connect the mobile object to at least a second node of the network, determined relative to the first node according to the traffic routing policy, and
controlling at least part of the traffic routed by the network, so as to redirect the part of the traffic to the mobile object via at least the second node of the network,
wherein the mobile object is configured to analyze and filter at least the part of the traffic redirected to the mobile object,
and wherein the mobile object is configured to establish communication by radiofrequency link in order to connect to at least the second node, and the movement of the mobile object is remotely controlled to approach a geographical position of the second node.

14. A mitigation server for assisting a communication network capable of routing traffic characteristic of a computer attack of a denial-of-service type,
the mitigation server being configured for, in response to detection of a computer attack:
identifying at least a first node of the network, requiring mitigation intervention,
identifying a traffic routing policy in the network,
controlling a movement of at least one mobile object, the mobile object comprising at least one communication interface for connecting to at least one node of the network, the movement controlling being performed so as to connect the mobile object to at least a second node of the network, determined relative to the first node according to the traffic routing policy, and
controlling at least part of the traffic routed by the network, so as to redirect the part of the traffic to the mobile object via at least the second node of the network,
wherein the mobile object is configured to analyze and filter at least the part of the traffic redirected to the mobile object,
and wherein the mobile object is configured to establish communication by radiofrequency link in order to connect to at least the second node, and the movement of the mobile object is remotely controlled to approach a geographical position of the second node.

* * * * *